United States Patent [19]

Wyers

[11] Patent Number: 5,004,133
[45] Date of Patent: Apr. 2, 1991

[54] DETACHABLE ARTICLE CARRIER ASSEMBLY

[76] Inventor: Philip W. Wyers, 6476 S. Ivy Ct., Englewood, Colo. 80111

[21] Appl. No.: 341,124

[22] Filed: Apr. 20, 1989

[51] Int. Cl.$^5$ .................................................. B60R 9/10
[52] U.S. Cl. ........................ 224/42.45 R; 224/42.03 B
[58] Field of Search .................. 224/42.03 B, 42.03 R, 224/42.03 A, 42.06, 42.45 R, 315, 323, 324; 211/17, 18, 22, 5, 7, 8; 403/154, 155; 280/415.1, 416.1, 504, 417.1, 425.2, 441.2

[56] References Cited

U.S. PATENT DOCUMENTS

| | | | |
|---|---|---|---|
| 470,507 | 3/1892 | Risser | 403/154 |
| 2,432,732 | 12/1947 | Del Cano | 224/42.03 B |
| 2,772,799 | 12/1956 | Bridinger | 224/42.03 R |
| 3,658,201 | 4/1972 | Williams et al. | |
| 3,853,255 | 12/1974 | Spencer | |
| 4,057,182 | 11/1977 | Kolkhorst et al. | 224/42.45 R |
| 4,301,953 | 11/1981 | Abbott | |
| 4,380,344 | 4/1983 | Abbott | |
| 4,461,410 | 7/1984 | Tartaglia | 224/42.03 B |
| 4,576,395 | 3/1986 | Longoria | 224/42.03 R |
| 4,676,413 | 6/1987 | Began et al. | 224/42.03 B |
| 4,676,414 | 6/1987 | Deguevara | 224/42.03 B |

FOREIGN PATENT DOCUMENTS 8402794  4/1986  Netherlands ...................... 280/415.1

Primary Examiner—Linda J. Sholl
Attorney, Agent, or Firm—Fields, Lewis, Pittenger & Rost

[57] ABSTRACT

An article carrier assembly suitable for detachably mounting a variety of articles to a vehicle such as bicycles, skis, motorcycles and like articles. An upwardly projecting stub shaft is fastened to a horizontally extending mounting surface on the vehicle such as the trailer hitch tongue. The carrier member has a hollow column portion with a lower end portion that slidably telescopes over and these telescoping parts are constructed and arranged so the stub shaft provides the sole means of supporting the carrier member. A locking pin prevents the column portion and stub shaft from being separated. A bicycle-supporting carrier member has a cross member supporting a pair of support rods with offset free end portions. A pair of hold-down arms with looped end portions that fit over associated of the offset end portions to be pivotal to and removable from the support rods. The hold-down arms are releasably fastened at ends opposite the offset end portions to hold one or more bicycles to the cross member.

12 Claims, 2 Drawing Sheets

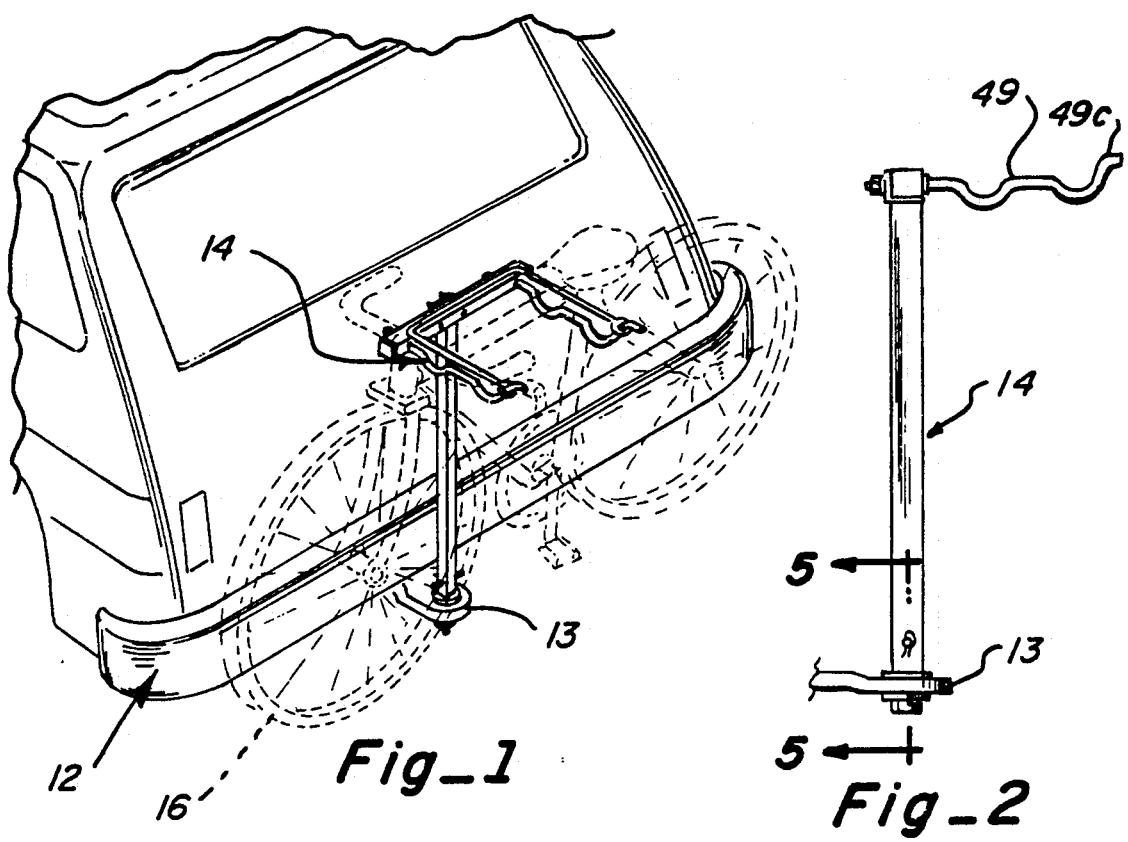
Fig_1  Fig_2
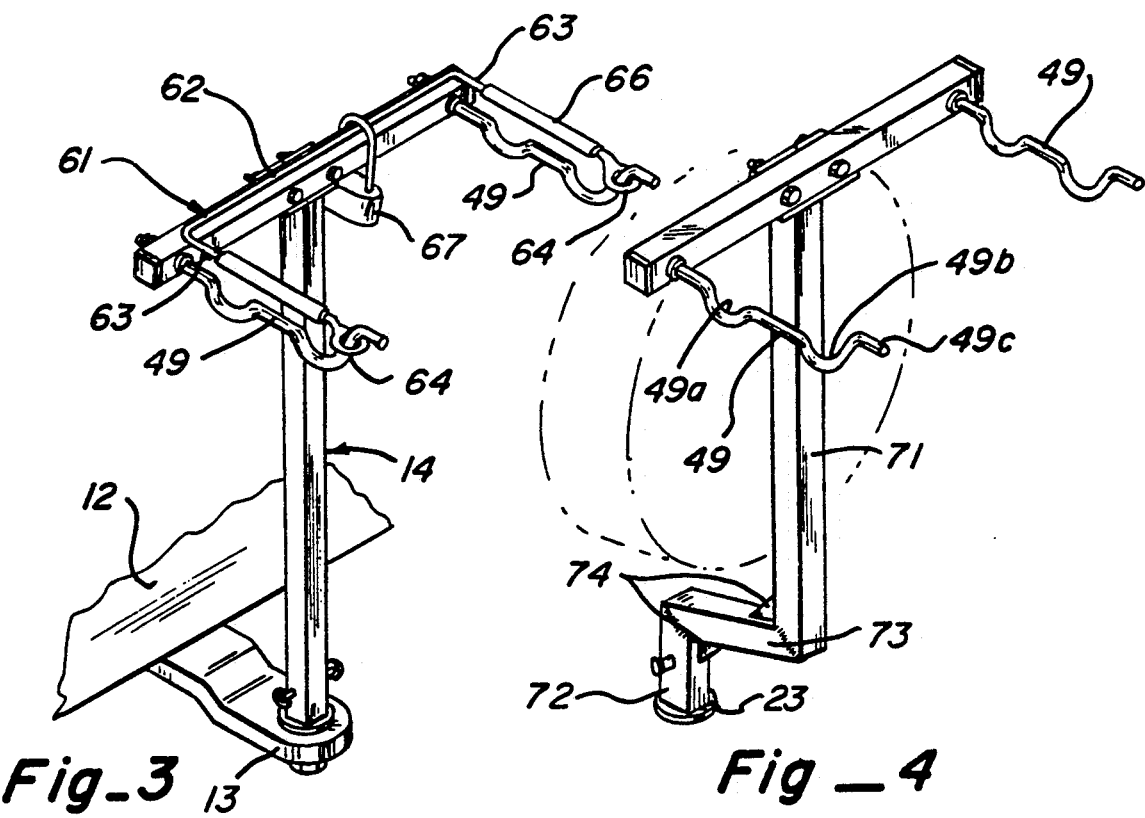
Fig_3  Fig_4

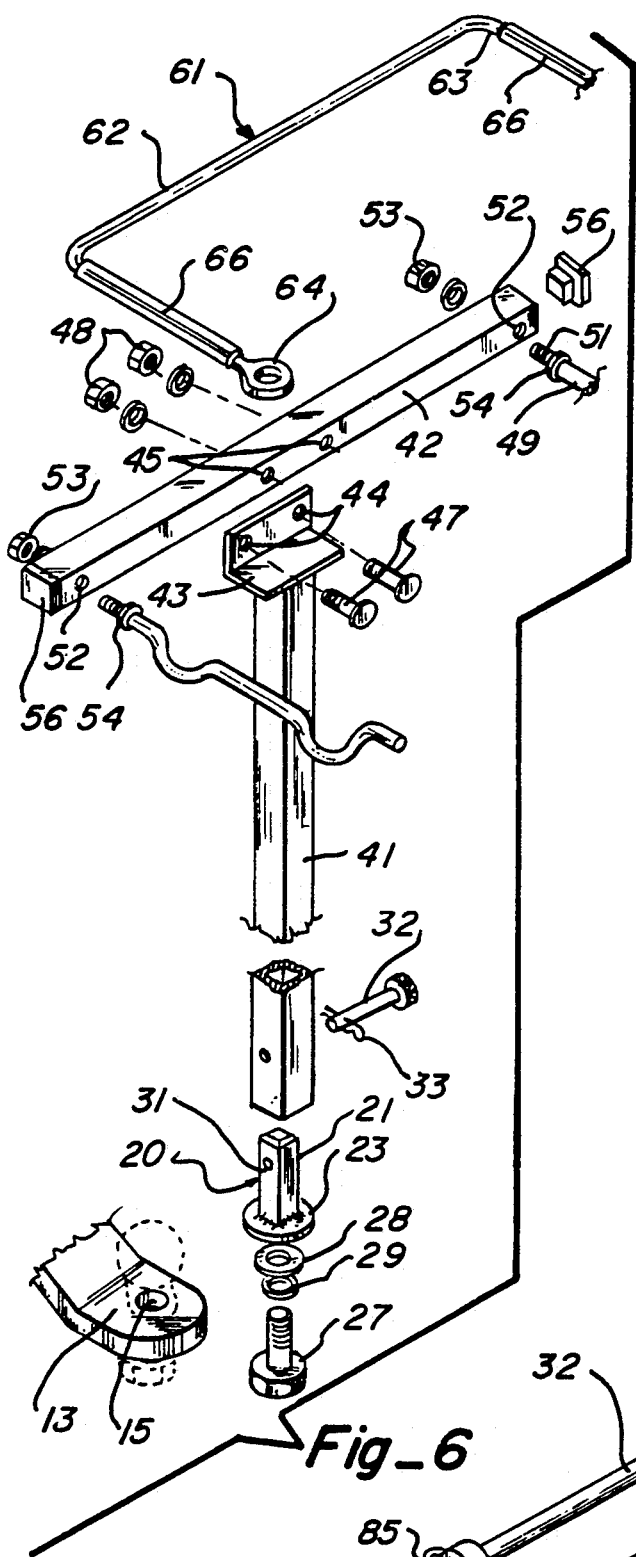
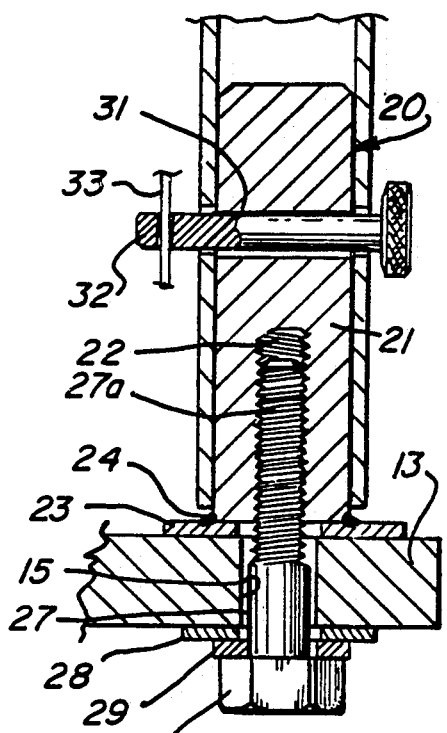
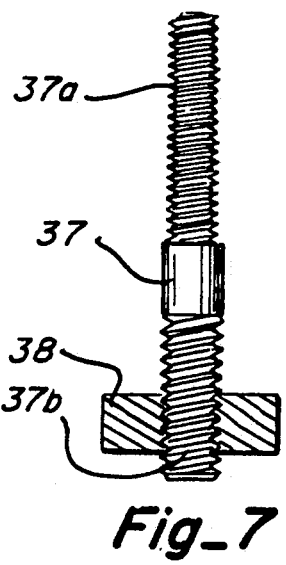
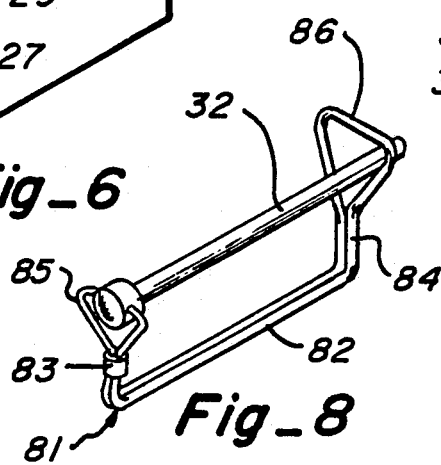

DETACHABLE ARTICLE CARRIER ASSEMBLY

TECHNICAL FIELD

This invention relates generally to carriers for transporting articles on a vehicle and is particularly suitable for carrying one or more bicycles on a vehicle having a generally horizontal, mounting surface such as that provided by a trailer hitch tongue.

BACKGROUND ART

A variety of article carriers have heretofore been provided for mounting on vehicles, particularly at the front or rear of a vehicle to enable a variety of articles such as bicycles, motorcycles, skis and the like to the vehicle to increase the carrying capacity of the vehicle.

In general, there are a number of article carriers that have a number of mounting arms that bolt to a vehicle frame such as that disclosed in U.S. Pat. No. 3,658,201.

A number of article carriers particularly suitable for bicycles have heretofore been devised. U.S. Pat. Nos. 4,676,414 and 3,853,255 disclose a carrier member that has a horizontally disposed end portion that is particularly suited for being telescopically received in a horizontally disposed trailer hitch affixed to the frame of a vehicle. U.S. Pat. No. 4,461,410 discloses a motorcycle carrier assembly wherein a first plate adapted to fit on a trailer hitch tongue is affixed to the bottom of a carrier shaft and a second plate fits under the first plate and two fastening bolts extend through the plates to secure the carrier assembly to the trailer hitch. U.S. Pat. Nos. 4,301,953 and 4,380,344 disclose a device that attaches to the tongue using the trailer hitch ball that has an upper carrier member that telescopes in a socket.

DISCLOSURE OF THE INVENTION

A single stub shaft is rigidly mounted to project up from a generally horizontal mounting surface on a vehicle such as a trailer hitch tongue preferably using a bolt fastener. The stub shaft preferably is of a square cross section and made of a solid metal material. A carrier member specifically adapted to the article to be carried detachably mounts to the stub shaft and has a generally vertically extending hollow column portion having a lower end portion that slides down and telescopes over the stub shaft to provide a readily detachable mount for the carrier member with the stub shaft being of a sufficient height and strength to provide the sole support for holding the carrier member on the vehicle during transport. A hold-down assembly is disclosed that is readily pivotal and removable on bicycle support arms to hold bicycles when the carrier member is carrying bicycles.

BRIEF DESCRIPTION OF THE DRAWINGS

FIG. 1 is a top perspective view of an article carrier assembly embodying features of the present invention mounted on the trailer hitch tongue of a motor vehicle and shown carrying a bicycle indicated in dashed lines.

FIG. 2 is a side elevation view of the article carrier assembly shown in FIG. 1.

FIG. 3 is an enlarged top perspective view of the article carrier assembly shown in FIG. 1 without the bicycle.

FIG. 4 is an alternative form of article carrier assembly having an offset support column portion to accommodate a spare tire or like protruding member as indicated in dashed lines.

FIG. 5 is a sectional view taken along line 5—5 of FIG. 2.

FIG. 6 is an enlarged exploded view of the article carrier assembly shown in FIGS. 1-3.

FIG. 7 is a sectional view of an alternative form of bolt fastener.

FIG. 8 is a perspective view of an alternative form of locking pin assembly.

DETAILED DESCRIPTION

Referring now to the drawing, there is shown a motor vehicle 12 having a trailer hitch tongue 13 attached to the frame of the vehicle in a conventional manner and extending beyond the rear bumper. An article carrier assembly 14 according to the present invention is shown detachably mounted on the trailer hitch tongue 13. The trailer hitch tongue 13 has the conventional vertically extending aperture 15 formed in an end portion thereof and typically carries a ball hitch as shown in dashed lines in FIG. 6. A bicycle 16 is shown mounted on the carrier assembly 14. While a trailer hitch tongue has been shown as providing a suitable horizontal mounting surface for the stub shaft described herein, it is understood that other structure on a vehicle including a bumper or a deck as, for example, inside a van would be of sufficient structural strength to support the stub shaft and the associated carrier assembly and load.

A stub shaft 20 preferably is a solid shaft body 21 of square cross section having a preselected height and preselected thickness and of substantially uniform cross section throughout its length. It is understood that other multi-sided configurations or cylindrical cross sections would be suitable for the stub shaft. Stub shaft 20 is mounted on the trailer hitch tongue in place of the usual trailer hitch ball. The stub shaft body 21 shwon in one embodiment has a thickness of 1 inch by 1 inch and is of a height of about 3.25 inches. This is a ratio of height to thickness of 3.25 to 1. The stub shaft body 21 has an internally threaded, central bore 22 extending up from the bottom. A flat washer 23 is shown affixed to the bottom of the stub shaft body as by a weld 24 with the washer projecting laterally our from the bottom end of the stub shaft and seated on top planar horizontally disposed surface of the trailer hitch tongue 13. The external dimension of the washer 23 is greater than the external dimension of the column portion 41.

A fastener in the form of a bolt 27 with an externally threaded shaft portion 27a and a head portion 27b has the shaft portion 27a extending from the bottom up through the trailer hitch aperture 15 and threads into the internally threaded bore 22 as best seen in FIG. 5. A flat washer 28 and a lock washer 29 are used between the head portion 27b and the tongue 13 to enable the stub shaft to be rigidly fastened to the tongue when the bolt is turned so as to be tightly fastened to the tongue and stub shaft. The stub shaft body 21 further has a transverse horizontally extending aperture 31 which receives a suitable pin 32 which serves to lock the column to prevent the carrier assembly from being separated from the stub shaft 20. A retainer 33 shown in the form of a pin prevents the accidental removal of pin 32. The stub shaft body 21 preferably is made of a cold, rolled mild steel and is of a sufficient size and strength and extends up a sufficient distance to provide the sole support for the carrier member so that no additional supporting structure is required.

An alternative fastener to bolt 27 shown in FIG. 5 may be a bolt 37 having double externally threaded shaft portions 37a and 37b with portion 37a threading into the throughbore 22 and a nut 38 that threads on portion 37b as seen in FIG. 7. An alternative arrangement would be to make the stub shaft body washer and an externally threaded shaft portion that would insert down into aperture 15 as a single piece and use a nut on the end of the externally threaded shaft portion.

The article carrier assembly 14 has a generally vertically extending hollow column portion 41 and an upper portion including a transverse top cross member 42 mounted at the top of the column portion 41. The column portion 41 has a lower end portion that slide fits on the telescopes around the stub shaft body. The column portion 41 shown is a straight length of square hollow tubing and has inner surfaces in a close, slide-fitting relation with the adjacent external surfaces of the stub shaft body. The embodiment shown has a length of 30 inches so that the ratio of the length of the stub shaft to the length of the column portion is 3.25 to 30.

An angle member 43 is shown affixed to the top of the column portion 41 and two spaced apertures 44 are provided therein. The top cross member has two apertures 45 and these apertures 44 and 45 line up and receive fasteners in the form of bolts 47 secured by nuts 48 to mount the cross member thereon. The cross member 42 shown is a straight length of metal tubing having a length of 17.5 inches.

A pair of spaced rearwardly extending bicycle support rods 49 are mounted to the top cross member 42. Each support rod has an externally threaded end portion 51 that extends through an aperture 52 in the top cross member and a pair of nuts 53 and 54 thread thereon. Each support rod 49 shwon is formed with a pair of spaced recessed portions 49a and 49b and the free offset end portion 49c is offset to a position above the threaded end portion 51. An end cap 56 closes the ends of the top cross member.

A removable hold-down member 61 for the bicycles shown has two spaced hold-down arms 63 that extend above associated support rods 49 and are connected at adjacent ends by a bight portion 62 which in turn is shown as releasably fastened to the cross member by a padlock 67. The free ends of each hold-down arm terminate in a loop portion 64 that slides over and is retained by the offset free end portion 49c of the associated support rod. The offset free end portion 49c locates the hold-down arm generally parallel to the associated support rod. A resilient sleeve 66 fits over each hold-down arm to cushion the contact with the bicycle. An alternative would be to have each hold-down arm 63 separately fastened at the front end to the associated support rod by suitable fastening means in which case no bight portion 62 would be required. This arrangement allows the hold-down arms to be pivoted about the offset free end portion 49c and removed as required. Another alternative to the padlock shown using bight portion 62 would be a hinge plate with slot or member 42 and loop secured to column portion 41 through which a padlock or like fastener would extend.

To assemble the stub shaft to the tongue requires only that the stub shaft be placed on the tongue and the bolt inserted up through the aperture and tightened. The carrier member is mounted by placing the lower column portion over the stub shaft and inserting the locking pin. Detachment simply requires removing the locking pin and lifting the column end portion off the stub shaft.

An alternative form of carrier assembly 14a shown in FIG. 4 has an upper offset section 71 outwardly displaced from a lower section 72 that slide fits over the stub shaft. The offset is provided by a horizontal section 73 with the structure preferably being reinforced by gussets 74. This alternative form accommodates a protrusion from the vehicle such as an externally mounted tire on the vehicle as is shown in dashed lines.

An alternative retainer mechanism 81 for the locking pin 32 as shown in FIG. 8 is a generally U-shaped resilient member having a bight portion 82, spaced arm portions 83 and 84 with an end loop 85 on arm portion 83 that extends through a hole in the head of the pin and an end loop 86 at the other arm portion that fits over the end of the locking pin and is moved axially along the pin away from the end of the pin for removal. This prevents accidental removal of the locking pin.

The article carrier assembly of the present invention has distinct advantages over known prior art in that it may be easily and quickly mounted on a trailer hitch tongue and also could be mounted on bumper structure or even in a deck within a vehicle in which an aperture could be drilled. The single stub shaft requires no other support for the carrier member. A significant advantage over prior known carrier mounts is that the carrier member is quickly demounted or detached from the stub shaft to allow access to vehicle cargo areas or open a tail gate on certain vehicles.

Although the present invention has been described with a certain degree of particularity, it is understood that the present disclosure has been made by way of example and that changes in details of structure may be made without departing from the spirit thereof.

What is claimed is:

1. Bicycle carrier apparatus comprising:
    a trailer hitch tongue with an aperture,
    a bicycle carrier assembly detachably mounted to said tongue, said carrier assembly including
    a generally vertically extending solid male stub shaft with a central internally threaded throughbore positioned in alignment with said aperture,
    a removable fastener having a head portion and an externally threaded shaft portion that extends through said aperture and threads into said stub shaft to rigidly fasten said stub shaft to said hitch tongue,
    a bicycle carrier member detachably mounted to said stub shaft, said carrier member including a generally vertically extending column portion having a hollow lower end portion defining a female socket slidably telescoping over said stub shaft and an upper portion on said column portion for engaging a bicycle to be carried, said column portion being at least five times longer than said stub shaft, said female socket sized and having an internal shape of a corresponding complementary shape with the external shape of said stub shaft to provide cooperating complementary mating surfaces in a close-fitting relationship, said stub shaft having a washer affixed at the bottom end, said washer projecting laterally out from the bottom end of said stub shaft, the external dimension of said washer being greater then the external dimension of said column portion, said stub shaft extending a sufficient distance upwardly into said female socket to provide the sole support for holding said column portion of said tongue in a generally vertical position, and a locking member extending through said column portion and said stub shaft to prevent said carrier member from becoming separated from said stub shaft.

2. Apparatus as set forth in claim 1 wherein said locking member includes a locking pin that slides into said female socket and said stub shaft, said locking pin having a retainer to prevent accidental removal, said retainer including a generally U-shaped resilient member having a looped end portion that slides over the end of said pin and moves axially along the pin to release said pin.

3. Apparatus as set forth in claim 1 wherein said stub shaft has a generally square cross section and of substantially uniform thickness throughout its height.

4. Apparatus as set forth in claim 1 wherein said shaft body has a washer affixed to a bottom end thereof with said washer seating on said mounting surface.

5. Apparatus as set forth in claim 1 wherein said stub shaft has a height to thickness ratio of about 3.25 to 1 and the ratio of the height of said stub shaft to said column is about 3.25 to 30.

6. Apparatus as set forth in claim 1 wherein said upper portion includes a top cross member affixed to said column portion and a pair of spaced support rods affixed at one end to said cross member and extending rearwardly therefrom, each said support rod having at least one recessed section to receive a portion of a bicycle, and a hold-down arm associated with each of said support rods to hold a bicycle in place on said support rods.

7. Apparatus as set forth in claim 6 wherein said cross member is square tubing and a rearwardly facing angle member is affixed to the top of said column portion, there being fastener means to fasten said cross member to said angle member.

8. Apparatus as set forth in claim 1 wherein said column portion has an offset section displaced outwardly from said lower end portion to accommodate an outwardly protruding object mounted on the vehicle.

9. Apparatus as set forth in claim 1 wherein said head portion of said fastener is affixed to one end of said shaft portion.

10. Apparatus as set forth in claim 1 wherein said fastener includes a bolt having a pair of oppositely disposed externally threaded shaft portions, an intermediate shaft portion with one of said threaded end portions threaded in said throughbore and a nut threaded on the other of said threaded shaft portions.

11. Bicycle carrier apparatus comprising:

a trailer hitch tongue with an aperture on a vehicle, a bicycle carrier assembly detachably mounted to said tongue, said carrier assembly including a generally vertically extending solid male stub shaft with a central internally threaded throughbore positioned in alignment with said aperture, a removable fastener having a head portion and an externally threaded shaft portion that extends through said aperture and threads into said stub shaft to rigidly fasten said stub shaft to said hitch tonque, a bicycle carrier member detachable mounted to said stub shaft, said carrier member including a generally vertically extending column portion having a hollow lower end portion defining a female socket slidably telescoping over said stub shaft and an upper portion on said column portion for engaging the bicycle to be carried, said column portion being at least five times longer than said stub shaft, said female socket sized and having an internal shape of a corresponding complementary shape with the external shape of said stub shaft to provide cooperating complementary mating surfaces in a close-fitting relationship, said stub shaft having a washer affixed at the bottom end, said washer projecting laterally out from the bottom end of said stub shaft, the external dimension of said water being greater than the external dimension of said column portion, said stub shaft extending a sufficient distance upwardly into said female socket for providing the sole support for holding said column portion on said tongue in a generally vertical position, a locking member extending through said column portion and said stub shaft to prevent said carrier member from becoming separated from said stub shaft, said upper portion of said carrier member including a cross member and pair of spaced support rods attached at one end to said cross member and having free end portions on which one or more bicycles are disposed, said free end portions being upwardly offset from the attaching position to the cross member, and a movable hold-down means operatively associated with said free end portions, said hold-down means including a hold-down arm opposite each support rod having a looped end portion around the associated offset free end portion to enable pivotal movement and removal, said support arms bearing down against said bicycle.

12. Apparatus as set forth in claim 11 wherein said hold-down member is generally U-shaped with said arms joined by a cross-connecting bight portion, said bight portion being releasably fastened to said cross member.

* * * * *